Figure 1:
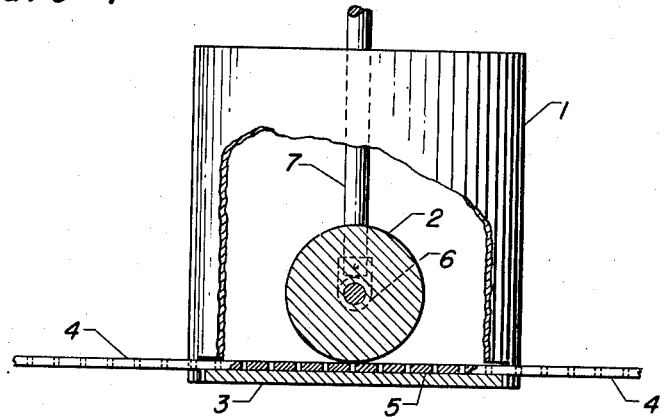

Nov. 19, 1957 L. G. MASSEY 2,813,299
PELLETING APPARATUS
Filed March 21, 1955

INVENTOR:
Lester G. Massey
By:
ATTORNEY:
AGENT:

United States Patent Office 2,813,299
Patented Nov. 19, 1957

2,813,299

PELLETING APPARATUS

Lester G. Massey, Chicago, Ill., assignor to Universal Oil Products Company, Des Plaines, Ill., a corporation of Delaware Application March 21, 1955, Serial No. 495,470

3 Claims. (Cl. 18—1)

This invention relates to apparatus for forming pellets, pills, briquettes, or similar aggregates from solid or semi-solid material or particularly from fine powders which may or may not contain liquid.

There are many applications when it is desired to form pellets or pills from material such as powder or dust which has small dimensions. Forming fine powder into pellets is frequently helpful in converting the material to a more useful form such as in the case of medicine wherein pellets or pills of material provide the proper dosage in a form that is readily consumed. It is also desirable to prevent dusting of fine powders such as carbonaceous fuels and therefore the briquetting of coal, charcoal or coke dust to form aggregates of larger sizes which are clean and easy to use is desirable.

Another application in which it is desirable to form pellets from a powder is in the manufacture of catalyst wherein the catalytic material in the form of pellets is more convenient to use and in some cases quite necessary since beds of material of small dimensions may present an almost impregnable barrier to the flow of fluid material therethrough. By forming the powdered material into pellets of larger dimensions, for example ⅛ by ⅛ inch cylinders, a high degree of permeability is imparted to the bed so that fluid material may flow therethrough with little pressure drop but with efficient contacting.

The pelletable material employed may be any powder or dust, or in many cases semi-solid gelatinous material such as hydrosols of silica or alumina which are in some stage of becoming solid. A typical silica hydrosol may be made by commingling a soluble alkali metal silicate such as sodium silicate, as in the form of water glass, with a mineral acid such as sulfuric acid in proportions to form a mixture having a pH of from about 3 to about 8. This material, which is at first a liquid, becomes increasingly more viscous as the gelation continues and eventually becomes what is described as a vibrant hydrogel, which is a semi-solid form of the material containing all the water from which it was made in suspension therein. This hydrogel may be ground up and pelleted and subsequently dried to form a solid material or it may be first dried and then ground up and pelleted. Hydrogels may be made from the oxides of many other materials such as aluminum, magnesium, titanium, zirconium, iron, etc. and these may be pelleted by the method of this invention.

Pelleting is effected by compressing the pelletable material into a form or mold having the shape desired for the ultimate pellet. The strength of the pellet that results is dependent upon the compression used in its formation and to a great extent on the nature of the material pelleted. The pelleting quality of a material may be improved by adding binding material such as drying oil, Sterotex or hydrogenated vegetable oil, graphite and other well known binding materials which may be subsequently removed by burning or other means when the nature of the pelleted material permits. It is an object of this invention to provide an apparatus which is particularly useful for pelleting such substances or mixtures of such substances to form strong, compressed, uniformly sized and shaped pellets or pills continuously and rapidly.

It is an embodiment of this invention to provide a pelleting apparatus comprising in combination a mulling means with the mulling surface slotted and adapted to receive moving perforated conveying means.

In a more limited embodiment this invention relates to a pelleting apparatus comprising in combination a rotary mixer muller with its floor slotted and adapted to receive a moving, perforated conveying means.

The apparatus is particularly useful inasmuch as the mulling means provides for a mixing, grinding, and compressing action, all three of which are useful and adaptable to the present process. Therefore, when it is desired to add a binding material such as the aforementioned hydrogenated vegetable oil to the material to be pelleted it is extremely desirable that the binding material is intimately admixed with the material to be pelleted so that composition uniformity of the pelletable material is attained which will cause the ultimate pellets to be homogeneous. The present invention provides for such intimate mixing and for extremely small particle size of both the pelletable material and any binding material included therewith.

Figure 2:
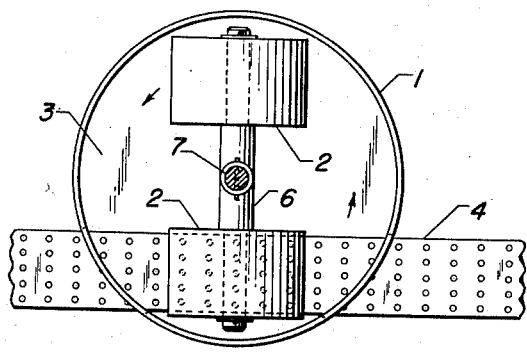
Figure 3:
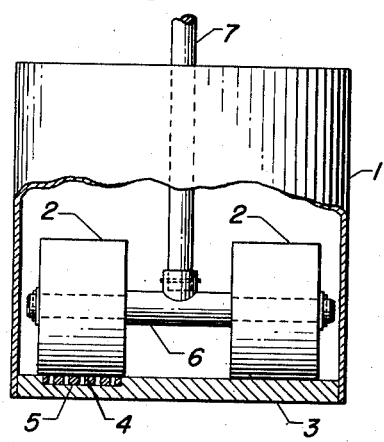
Figure 4:
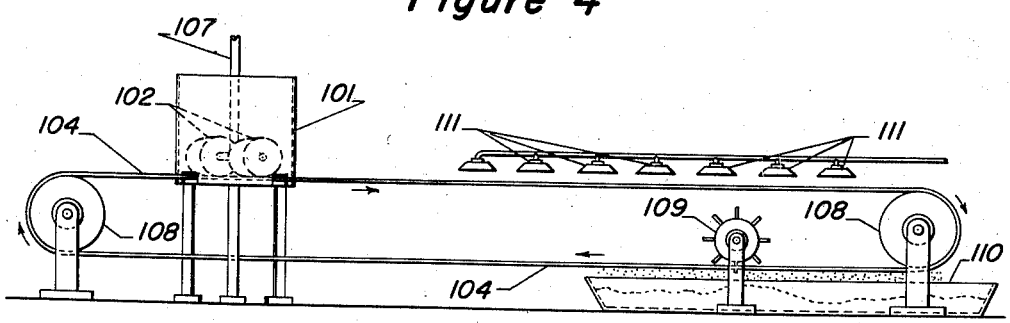

The apparatus of the present invention can be best described with relation to the accompanying drawings which show in Figures 1, 2 and 3 the elevation, plan, and side view of one embodiment of this invention and in Figure 4 a schematic drawing of another embodiment employing an entire apparatus for the forming and recovery of pellets. It is intended that these drawings illustrate typical embodiments of this invention and do not limit the invention to the specific embodiments herein shown.

Referring to Figures 1, 2 and 3, one suitable apparatus for the performance of the present invention consists of a housing 1 being open on top and enclosed on the bottom with floor plate 3 with said housing containing rollers 2 which are connected and adapted to roll with a rotary motion around the interior of housing 1 bearing against floor plate 3. To impart the motion to rollers 2, an axle 6 connects the two rollers to each other and to shaft 7 which is connected to a suitable driving means to operate the apparatus, which driving means may be an electric motor, internal combustion engine, turbine, etc. Floor plate 3 of the apparatus contains a suitable slot or indentation 5 which is adapted to receive a continuous conveying means which in this present description is moving belt 4 to fit snugly in and pass therethrough. Slot 5 is positioned so that rollers 2 pass over its entire width as they rotate thereby putting pressure upon the entire width of conveying means 4 as it passes through slot 5. It may be seen from Figures 1 and 2 that conveying means 4 is perforated, preferably with slightly truncated conical perforations opening upward to receive pelletable material which is compressed in the perforations.

The rollers 2 are preferably broad faced and heavy so that they exert the maximum action upon the material to be mulled. The material in housing 1 is subjected to a rolling, grinding, mixing motion by the rollers 2 and when pushed over belt 4 it is compressed into the perforations with whatever pressure is desired, which pressure may be regulated by the weight of the rollers as well as whatever force is exerted upon shaft 7. Although not shown in the drawing it is contemplated that plows or baffles may rotate along with the rollers to continuously scrape material from the periphery or center of floor 3 into the path of the rotating rollers 2.

Figure 4 illustrates a complete apparatus for pelleting material which consists of housing 101 containing rollers 102 driven by shaft 107. As in the previously described embodiments, the pelletable material contained in housing 101 is compressed into perforations in moving belt 104 as it passes through a slot in the floor member of the apparatus. The moving belt carries the filled perforations from the housing 101 and in this embodiment the pelleted material passes beneath heaters 111 which may dry the material when it contains moisture, to set the material and possibly to cause a slight shrinkage which aids in discharging the pellets from the perforations. The perforated moving belt 104 passes over rollers 108 which hold the belt in its position and which may be connected to the driving means that moves the belt. Pellet discharging means 109 aids in discharging the pellets from the belt into collection pan 110. Means 109 may be a spiked wheel such as here shown for mechanically ejecting the pellets from the perforations by engaging the perforations with the spikes or it may include air blasting, vibration of the belt, or other suitable means.

Although herein shown as rotary mixing mullers, the mulling means employed in this invention may be of any suitable kind including rollers that move back and forth rather than in a circular path. The continuous conveying means may also be a rigid metallic member rather than a flexible conveyor belt which may move through the slotted floor plate in a back and forth manner rather than continuously in one direction. It is intended that other modifications of equipment which adapt it for particular uses are within the broad scope of this invention.

The pellets formed by this invention may be further treated when desired to improve their utility such as when an inorganic oxide having catalytic properties and high surface properties such as alumina, silica, silica-alumina or others made into pellets by this invention may be impregnated with other catalytic material such as metallic components to increase their utility. To obtain a finished catalyst, for example, it is usually necessary to impregnate the pelleted inorganic oxide material with solutions of soluble salts of the additional catalytic material and then precipitate the catalytic material by treating with an alkaline material or simply by drying and calcining the impregnated composite. The impregnation step may be effected before pelleting when better results are obtained by impregnating the powder.

From the foregoing it may be seen that this invention provides a means for continuously mixing, grinding and forming material into pellets of uniform size, shape, strength and composition in a single stage operation.

I claim as my invention:

1. A mulling and pelleting apparatus comprising a housing having a floor providing a horizontal mulling surface, a slot extending across the floor on the side thereof having the mulling surface and terminating short of the opposite side of the floor, a movable perforated conveyor member in said slot and means for moving the same lengthwise of the slot, a relatively heavy roller in the housing having its weight bearing upon said floor, means for moving said roller over the perforated conveyor member and over a substantial portion, at least, of the remainder of said mulling surface, and means for removing pellets from the conveyor member outside said housing.

2. A mulling and pelleting apparatus comprising a housing having a floor providing a horizontal mulling surface, a slot extending across the floor on the side thereof having the mulling surface and terminating short of the opposite side of the floor, a movable perforated conveyor member in said slot and means for moving the same lengthwise of the slot, the upper surface of said conveyor member being flush with the mulling surface of said floor, a relatively heavy roller in the housing having its weight bearing upon said floor, means for moving the roller over said floor in a circular path including portions of said conveyor member and said mulling surface, and means for removing pellets from the conveyor member outside said housing.

3. A mulling and pelleting apparatus comprising a housing having a floor providing a horizontal mulling surface, a slot extending across the floor on the side thereof having the mulling surface and terminating short of the opposite side of the floor, a movable perforated conveyor member in said slot and means for moving the same lengthwise of the slot, a pair of relatively heavy rollers mounted on an axle in the housing with the weight of the rollers bearing upon said floor, means for moving said rollers in a circular path around said mulling surface and across said conveyor member, and means for removing pellets from the conveyor member outside said housing.

References Cited in the file of this patent
UNITED STATES PATENTS

| | | |
|---|---|---|
| 1,106,087 | Du Pont et al. | Aug. 4, 1914 |
| 2,541,109 | Shabaker | Feb. 13, 1951 |